United States Patent

[11] 3,618,684

[72] Inventors Arthur J. Burke
Oakland;
Benjamin Martyn, Clifton; George C. Troost, Prospect Park, all of N.J.
[21] Appl. No. 788,764
[22] Filed Jan. 3, 1969
[45] Patented Nov. 9, 1971
[73] Assignee Howe Richardson Scale Company
Clifton, N.J.

[54] APPARATUS FOR FILLING BAGS WITH WEIGHED DRAFTS OF MATERIAL
17 Claims, 5 Drawing Figs.
[52] U.S. Cl. .................................. 177/114, 177/118, 141/67, 222/58
[51] Int. Cl. .................................................. G01g 13/24
[50] Field of Search ............................ 222/273, 193, 56, 26, 58, 55; 141/67, 68; 177/66, 71, 114, 118

[56] References Cited
UNITED STATES PATENTS
| | | | |
|---|---|---|---|
| 3,319,828 | 5/1967 | Maxwell .................. | 222/58 X |
| 2,669,941 | 2/1954 | Stafford .................. | 222/273 X |
| 2,866,484 | 12/1958 | Rose ....................... | 177/118 X |
| 3,094,181 | 6/1963 | Kershaw .................. | 222/56 X |

Primary Examiner—Robert B. Reeves
Assistant Examiner—James E. Kocovsky
Attorney—Norris & Bateman ABSTRACT: A bag filling apparatus wherein charges of material are successively weighed out by a scale and dispensed into a feed tank or other suitable receptacle having a spout or nozzle on which an empty bag is mounted. The charge in the tank is selectively discharged into the spout-mounted bag by blowing the charge out of the tank with a large volume of relatively low pressure, high-velocity air. As soon as each charge is dispensed from the scale to the feed tank, the next draft of material is automatically weighed out by the scale and held in the scale until the charge in the feed tank is delivered to the bag. When this occurs, the charge of material in the scale is automatically dispensed into the feed tank, and the scale is automatically operated to weight out the next draft. A control circuit which provides the foregoing automatic operation memorizes the presence of a charge in the feed tank to prevent the charge in the scale from being dispensed before the charge in the tank is delivered to the bag. The circuit also controls operation of a valve at the inlet of the tank to seal the inlet when pressurized air is admitted to the tank for dispensing the charge. This valve is held closed until the scale has completed each weighing to prevent blowback of pressurized air and consequent interference with the operation of the scale.

INVENTORS
ARTHUR J. BURKE
GEORGE C. TROOST
BENJAMIN MARTYN

INVENTORS
ARTHUR J. BURKE
GEORGE C. TROOST
BENJAMIN MARTYN

BY Morris & Bateman

ATTORNEYS

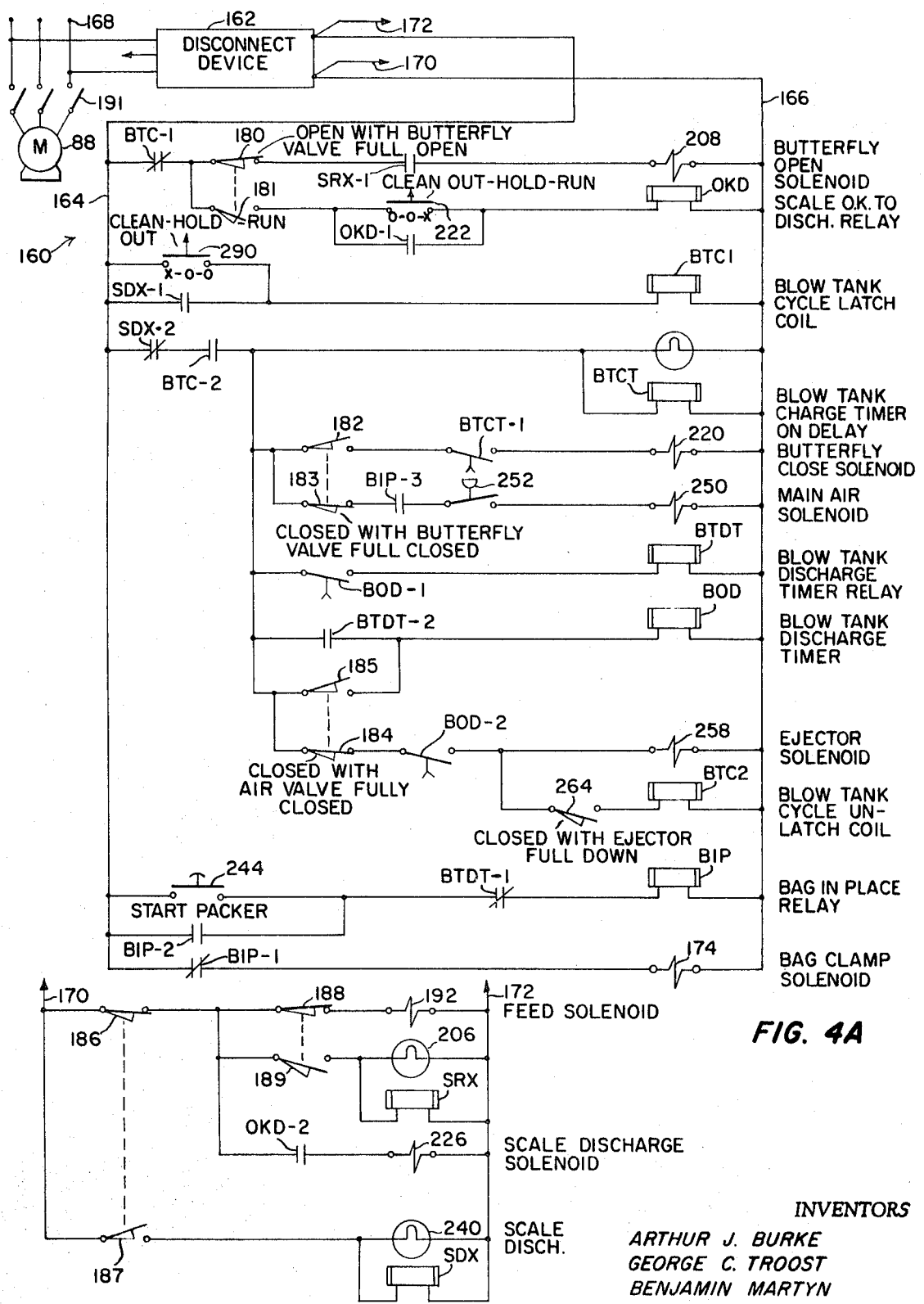

3,618,684

APPARATUS FOR FILLING BAGS WITH WEIGHED DRAFTS OF MATERIAL

FIELD OF INVENTION

This invention relates to apparatus for filling bags or other containers with material and more particularly to the type of bag filling apparatus wherein the charge of material dispensed to the bag is preweighed.

BACKGROUND

There are mainly two types of bag filling machines. One utilizes a gross weighing principle in which the amount of material delivered to the bag is controlled by weighing the bag and its contents as the bag is being filled. The other utilizes a preweighing principle wherein a preselected amount of material is first weighed out and then dispensed with the bag. Although this latter type, with which this invention is concerned is, in certain respects, more advantageous than the former type, it has not been employed as frequently owing to the fact that prior proposals, which are commercially available, do not rapidly and reliably dispense successive charges of material for filling the bags.

Some attempts have been made to overcome the foregoing deficiencies of prior preweighing-type bag filling machines, but none have been found to be entirely satisfactory.

SUMMARY AND OBJECTS OF INVENTION

According to this invention, the bag filling apparatus is divided into two main parts: a preweighing scale and a bag filling unit. The former weighs a charge of material and dispenses it to the latter. The filling unit dispenses the received charge into the bag. The preweighing scale is structurally independent of the filling unit except for interrelated controls. As a result, the filling unit of this invention may be utilized with a variety of different scales.

Delivery of material to the scale is so controlled that the amount delivered to make up one draft or charge in the scale will have a preselected weight. This draft is then discharged to a blow tank or other suitable receptacle which forms a part of the filling unit and which has as its outlet a spout or nozzle on which a bag to be filled is mounted. Upon delivery of the charge to the tank, the inlet of the tank is sealed off by a valve, and a large volume of relatively low-pressure air is admitted to the tank to blow the material out in a high-velocity air stream passing through the nozzle and into the bag on the nozzle. As soon as the scale dispenses one weighed out draft to the tank, it automatically recycles to weigh out the next draft. This next draft is held in the scale as long as there is a draft in the tank, and when the preceding draft in the tank is dispensed by an operator, the draft in the scale is automatically delivered to the tank in preparation for delivery to the next bag.

The foregoing interrelated operation of the scale and filling unit contributes significantly to the capability of the apparatus of this invention to fill bags at a rate which is appreciably greater than that of many prior machines. Also contributing to the increase in the feed rate as compared with some prior machines is the use of the large volume of relatively low-pressure air which passes through material of particulate form to blow the material out of the tank and into the bag in a high-velocity air stream.

The circuit for controlling the apparatus of this invention further provides for reliable operation by incorporating such features as that which prevents delivery of a draft from the scale to the filling tank when a draft of material is still in the tank. Other features ensure that the weight of the charge delivered to the bag is closely equal to the preselected weight. One such feature provides for the closure of the tank inlet when the scale is weighing out a draft of material to prevent a blow back of air that would objectionably influence the scale balance and thus result in an inaccurate weighing.

With the foregoing in mind it is an object of this invention to provide a novel bag filling apparatus which fills bags reliably at a rapid feed rate.

Another object of this invention is to provide a novel bag filling apparatus which is, without sacrificing reliability and rapidly of feed rate, relatively simple in construction.

Other important objects of this invention include the provision of a novel, electrical circuit for controlling the semiautomatic operation of the bag filling apparatus.

Further novel features, additional important objects, and other significant advantages of this invention will become more apparent from the appended claims and as the detailed description proceeds in connection with the drawings described below.

DESCRIPTION OF DRAWINGS

FIGS. 4A and 4B schematically illustrate the control circuitry for the bag filling apparatus illustrated in FIGS. 1-3.

DETAILED DESCRIPTION

Figure 1:
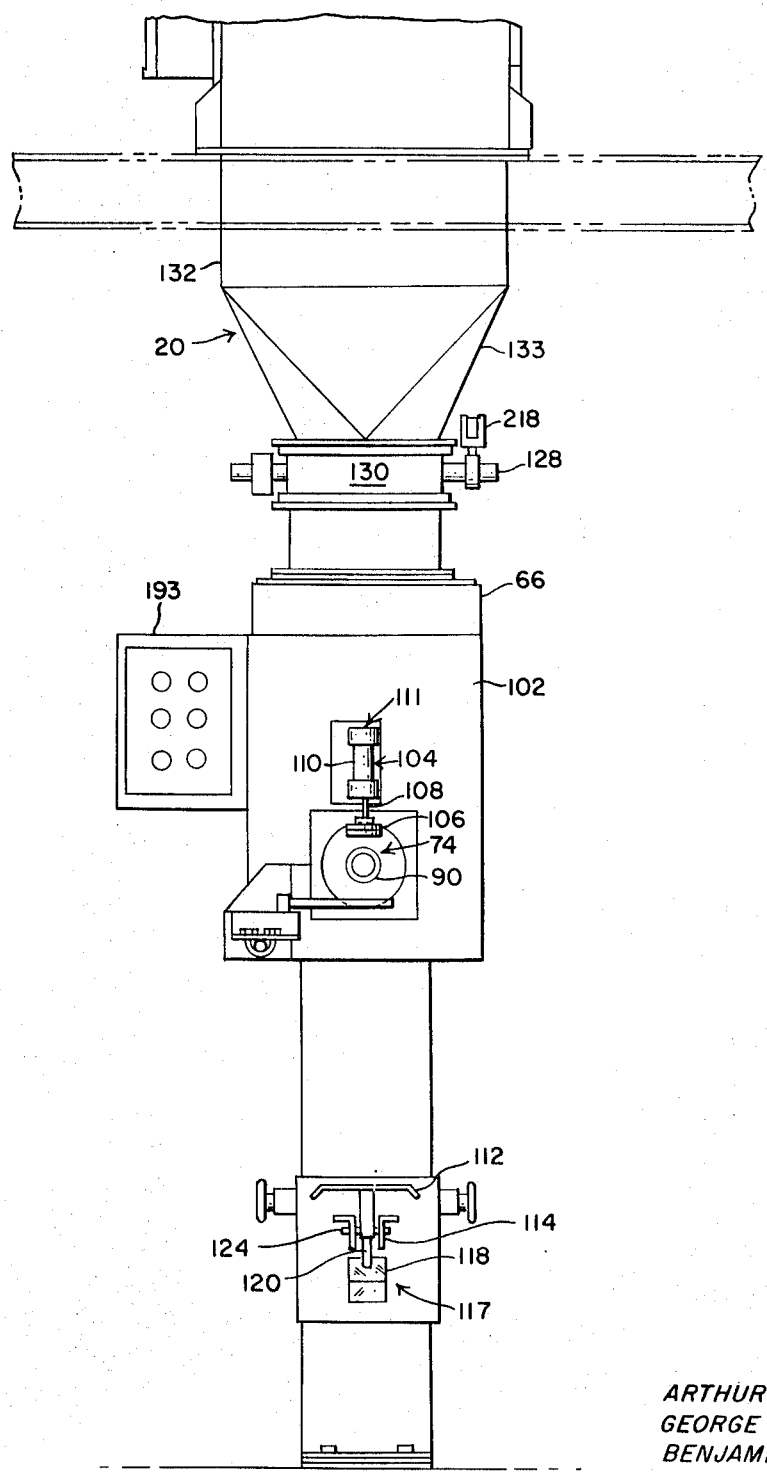
FIG. 1 is a front elevation of the bag filling apparatus according to a preferred embodiment of this invention.
Figure 2:
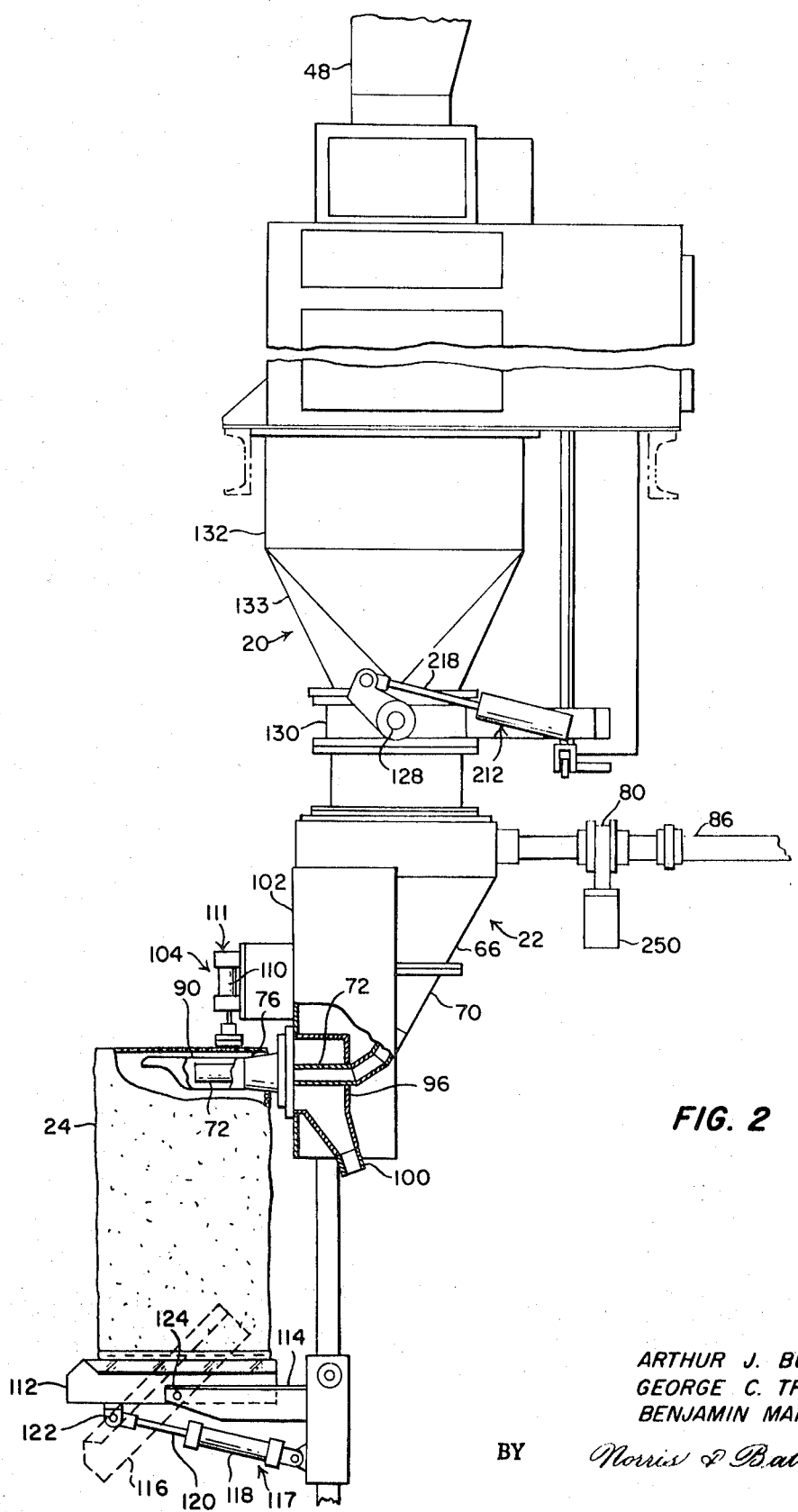
FIG. 2 is a side elevation of the bag filling apparatus shown in FIG. 1.
Figure 3:
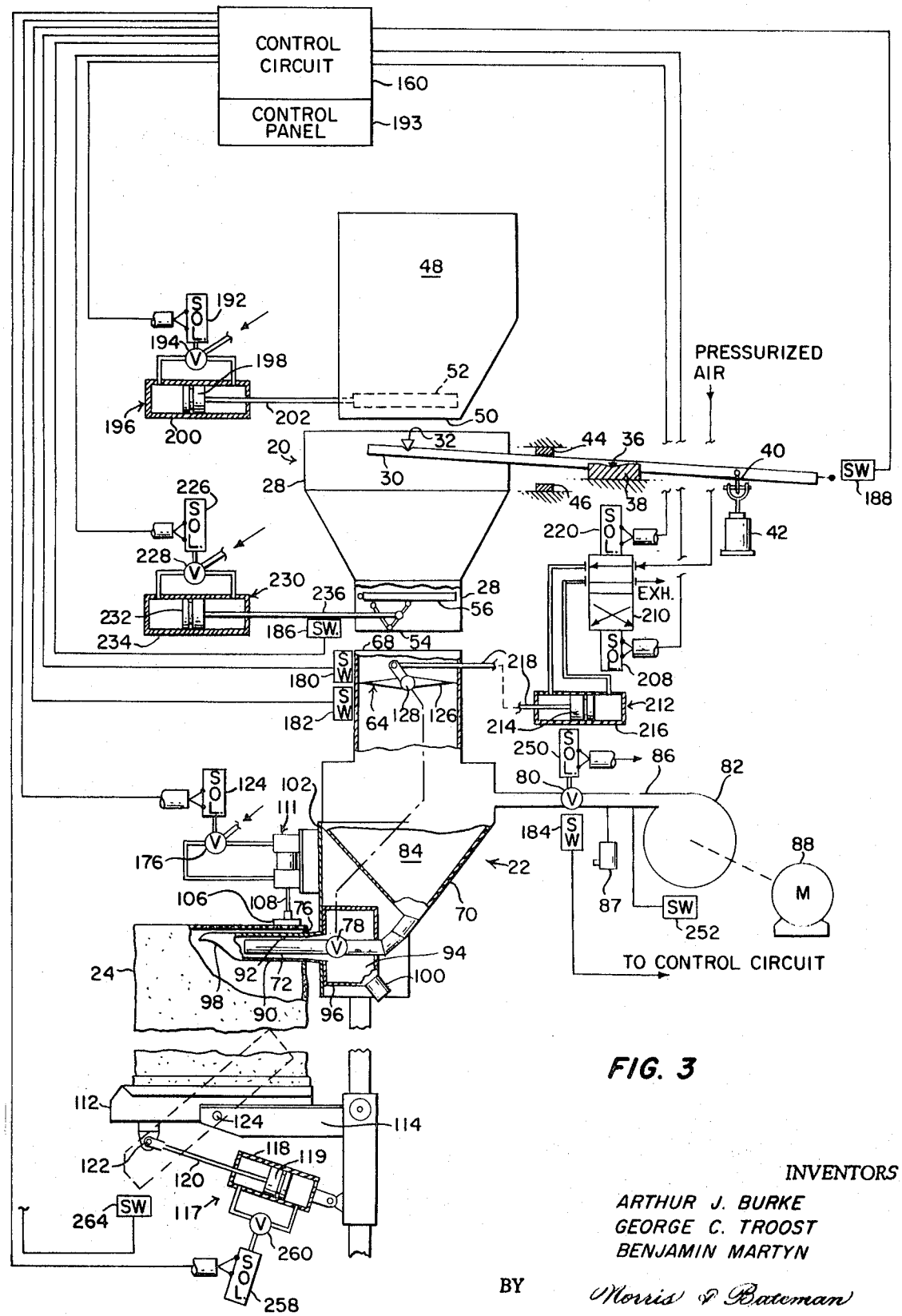
FIG. 3 is a diagrammatic view of the apparatus shown in FIG. 1.

The valve bag filling apparatus of the preferred embodiment of this invention comprises, as shown in FIGS. 1-3, a batch weighing machine or scale 20 and a bag filling unit 22. Scale 20, which is of conventional construction, weighs out the required, preselected amount of material to be packed into a valve bag indicated at 24 (see FIG. 2). The weighed-out draft of material is discharged from scale 20 into filling unit 22 from which it is packed into bag 24 by conveying it in a stream of high velocity, large volume, pressurized air. In this connection, the filling apparatus of this invention is particularly useful for packing bags or other containers with relatively dry, free-flowing, nonpowdery, granular material such as, for example, plastic particles, rice, granular fertilizer, urea prills, granulated sugar and salt.

Scale 20, which is of the preweigh type, may be the same as that described in U.S. Pat. No. 3,252,531 issued on May 24, 1966 for Weighing Apparatus. As shown in FIG. 3, scale 20 mainly comprises a weigh hopper 28 which is supported from the free end of a weigh beam structure 30 by a suitable knife edge and load bearing assembly 32. Beam structure 30 is fulcrumed about a horizontal axis by a suitable pivot assembly comprising a knife edge 36 which is fixed to beam structure 30 and which is seated on a fixed knife edge bearing 38.

A rod carrying counterweights 42 to balance hopper 28 and the material delivered thereto is pivotally suspended from beam structure 30 on the side of the fulcrum axis that is opposite from hopper 28. Beam structure 30 is freely swingable about its fulcrum axis between upper and lower closely spaced, fixed stops 44 and 46 and occupies a static, balanced position between stops 44 and 46 when a predetermined weight of material in hopper 28 counterbalances weights 42.

Material to be segregated into discrete, measured drafts of preselected weight by scale 20 is stored in a supply bin indicated at 48 in FIGS. 1-3. In this embodiment, bin 48 has a bottom discharge opening 50 located vertically above the open upper end of hopper 28. Delivery of the material stored in bin 48 to hopper 28 is controlled by a feed door or feed gate 52 of suitable form.

In place of the single feed rate supply arrangement shown in FIGS. 1-3, a dual feed rate apparatus for delivering material to scale 20 may be employed and may be the same as that shown in U.S. Pat. No. 3,252,531. The dual feed apparatus provides for a coarse or full feed flow rate and a fine or dribble feed flow rate. Material is initially delivered to the weight hopper at the full feed rate which is considerably greater than the dribble feed rate, and as the weight of the material delivered to the weigh hopper approaches its preselected weight as determined by the counterweights, the full feed flow is stopped and the draft is topped off with material delivered at the dribble feed rate. This dual feed rate provides for more accurate weight measurements as compared with a single coarse feed rate supply arrangement.

For simplicity, the feed arrangement in this invention will be described as having only one feed rate, although it will be appreciated that where desired, the full and dribble feed rates described in U.S. Pat. No. 3,252,531 may be employed.

When door 52 is opened, material in bin 48 is discharged by gravity in a continuous, descending stream into weigh hopper 28. The bottom of hopper 28 has a discharge opening 54 which is closed by a discharge door 56 while hopper 28 is being filled. As the weight of material delivered to hopper 28 approaches the value which will counterbalance weights 42, beam structure 30 swings away from its rest position on upper stop 44, and as it closely approaches its static balance position between stops 44 and 46 a signal is generated in a manner to be described in detail later on to close feed door 52.

By closing door 52, the delivery of material to hopper 28 is interrupted, and the weight of the draft of material in hopper 28 will be substantially equal to the preselected value as determined by weights 42. This type of scale is frequently referred to as a preweigher.

As shown in FIGS. 1–3, filling unit 22 is vertically below hopper 28 and comprises a blow tank 66. Tank 66 has a top inlet opening 68 and a funnel shaped lower discharge portion 70 which terminates at its lower apex end in a discharge tube 72. The open discharge end of tube 72 is disposed within a spout or nozzle member 90. The bag valve, which comprises a side opening 76 (see FIGS. 2 and 3) in bag 24, is adapted to receive nozzle member 90.

As shown, inlet opening 68 is vertically below and in alignment with the bottom discharge opening 50 of scale 20. Mounted in opening 68 is a suitable valve structure such as a butterfly valve which is indicated at 64 in FIG. 3. When valve 64 is moved to its illustrated closed position, it closes off opening 68 with a fluidtight seal.

When discharge door 56 and valve 64 are opened, material in hopper 28 is allowed to flow out of hopper 28 by gravity and into tank 66 through inlet opening 68. Valve 64, as will be described in detail shortly, will close after a draft of material in hopper 28 is discharged in a descending stream into tank 66 to thus seal off inlet opening 68 in preparation for the bag filling operation in which the charge of material in tank 66 is fed into bag 24.

By clamping a bag on nozzle member 90, an air valve 80 (FIGS. 2 and 3) will be opened in a manner to be explained shortly to establish fluid communication between an air blower 82 and a chamber 84 which is defined by tank 66.

As shown in FIG. 3, valve 80 is in an air delivery conduit 86 which is connected at one end to the outlet of blower 82. The opposite end of conduit 86 opens into the upper portion of chamber 84 just below butterfly valve 64 and preferably above the draft of material in tank 66.

Blower 82 is continuously driven by an electric motor 88 so that when valve 80 opens, a large volume of relatively low-pressure air is admitted to chamber 84. Upon entering chamber 84, the pressurized air, by virtue of its large volume and relatively low pressure, will pass through material of particulate form in tank 66 and will flow out through tube 72 in relatively high-velocity air stream. The particulate material in tube 72 is blown out by this high-velocity air stream, and the main body of material will therefore settle or move down in tank 66 so that particles are continuously fed into the air stream and carried out through nozzle member 90 and into bag 24.

It will be noted that, although the air passes through the material, the main body of material in tank 66 is not fluidized in the sense that the particles in the main body about the lower end of tank 66 are not suspended in envelopes of air.

The pressure of the air admitted to chamber 84 is sufficiently high to enable the mass of air to pass through a charge of particulate material in tank 66. On the other hand, the pressure of air entering tank 66 is not so high as to have a ram effect, causing the material to be compactly packed down in chamber 84. If such a condition occurred, the material, by virtue of being packed down in tank 66, would resist the applied discharge force and would thereby increase the time needed for filling each bag.

It was found that discharging the material into bag 24 in this manner is considerably more rapid as compared with systems utilizing a relatively high-air pressure source. For example, 10 to 21 cubic feet of free air (at atmospheric pressure) compressed to 10 p.s.i.g. will discharge about fifty pounds of material in particulate form in 2 ½ to 5 seconds depending upon the material and other factors. It is clear that the air volume needed for discharging the draft will increase as the discharge time increases; that is, 10 cubic feet will be admitted in 2 ½ seconds, and about twice that volume will be admitted in 5 seconds.

It will also be appreciated that all of the material in tank 66 is discharged by the air supply and packed into bag 24. The contents packed in bag 24 will therefore be the entire preweighed draft of material which was weighed out and discharged by scale 20. Blower 82 may be provided with a suitable relief valve means 87 (FIG. 3) to relieve the air pressure when valve 80 is closed.

As shown in FIGS. 2 and 3, the discharge end of tube 72 is concentrically received in nozzle member 90. The discharge end of tube 72 terminates inwardly of the open end of nozzle member 90, and member 90 forms with the discharge end portion of tube 72 an annular vent passage 92. The discharge end may be directed downwardly and forwardly at an angle of about 45° with the axis of member 90 so that if there is no bag on nozzle member 90, the material blown out of tank 66 will not be discharged horizontally.

At its end remote from bag 24, passage 92 opens into a chamber 94 which is confined by a rectangular enclosure 96. Bag 24, as shown in FIG. 2, is slipped over nozzle member 90 so that member 90 extends through opening 76 and has its contoured, tapered end 98 disposed within the bag. The displaced air in bag 24 flows out through passage 92 and into chamber 94 from which it discharges to atmosphere through a rearwardly directed outlet indicated at 100 in FIGS. 2 and 3. In this manner, the interior of bag 24 is vented to prevent an excessive air pressure buildup and to thus facilitate rapid filling of the bag with the weighed-out draft of material.

Although bag 24 is described herein to be of the valve type having a side filling opening, it will be appreciated that the filling apparatus described herein may be employed to fill other types of bags or containers.

To prevent material in tank 66 from flowing out of nozzle member 90 before valve 80 is opened, a valve 78 is disposed in tube 72 and is operatively connected to valve 64 so that it will be closed when valve 64 is open and will open when valve 64 is closed.

As shown in FIGS. 1 and 2, nozzle member 90 is mounted on a rigid vertically extending support plate structure 102 and extends horizontally forwardly from structure 102 to provide the necessary clearance for placing bag 24 on member 90. Also mounted on plate structure 102 is a bag clamp assembly 104 comprising a clamping pad 106 which is fixed on the lower end of a vertically extending piston rod 108. The other end of rod 108 is secured to an unshown piston which is slidable in a cylinder 110. Cylinder 110 is securely fixed on support structure 102 with the vertical axis of rod 108 normally intersecting the longitudinal axis of nozzle member 90. Cylinder 110 and the unshown piston define an air-operated motor 111, and when air pressure is supplied to a selected operating port of cylinder 110, rod 108 is extended to securely clamp the upwardly facing portion of bag 24 between pad 106 and the opposed peripheral portion of member 90. In this manner, bag 24 is secured in place in its filling position on nozzle member 90.

Still referring to FIGS. 1–3, bag 24 when placed for filling on nozzle member 90 is supported on a tiltable platform 112 which is mounted on a rigid support structure 114 for pivotal movement between the full line horizontal, bag-supporting position and a downwardly inclined bag-ejecting position as shown by the phantom lines indicated at 116.

An air-operated motor 117 comprising a piston-receiving cylinder 118 is operable to swing platform 112 between its angularly spaced apart bag-supporting and bag-ejecting positions. A piston 119 (see FIG. 3) which is slidable in cylinder 118, is connected to a piston rod 120, and rod 120 is pivotally connected to platform 112 at 122.

Platform 112 is pivoted on support structure 114 by the connection indicated at 124. Connection 124 is disposed rearwardly and at a higher level with respect to pivot connection 122 so that when rod 120 is drawn into cylinder 118, the forward end of platform 116 tilts downwardly to its bag-ejecting position. Platform 112 may be adjusted vertically to accommodate bags of different lengths.

When bag 24 is filled, clamping assembly 104 and motor 117 are operated to respectively release the bag from nozzle member 90 and to tilt platform 112 down to its bag-ejecting position. As a result, bag 24 will slide off platform 112 and advantageously onto some suitable, unshown receiving means such as a conveyor which carries the filled bag away from the filling apparatus.

Still referring to FIGS. 1–3, butterfly valve 64 is of suitable, conventional construction and comprises a disc-shaped closure member 126 which is mounted on a shaft 128. Shaft 128 is journaled for rotation about a horizontal axis by suitable bearings which are supported by a flange conduit section 130. Conduit section 130 is mounted on the top of tank 66 and supports at its upper end a suitable casing 132 which provides a partial enclosure for scale 20. At its lower end, enclosure 132 terminates a transition spout 133 of suitable form for directing material from hopper 28 to tank 66.

Referring now to FIGS. 4A and 4B, a control circuit 160 providing for the semiautomatic operation of the filling apparatus thus far described is shown in standby, deenergized condition and comprises a disconnect switch 162 which when closed connects a pair of electrical conductors 164 and 166 across a suitable source of AC power indicated at 168. A further pair of electrical conductors 170 and 172 are also connected to source 168 when switch 162 is closed.

The operation of circuit 160 will be described starting with the condition where storage bin 48 is filled with material and where there is no material either in scale 20 or in tank 66. Beam structure 30 will therefore be in its unbalanced position on stop 44. With the circuit in its standby, deenergized condition, feed door 52 will be closed, discharge door 56 will be closed, butterfly valve 64 will be closed, and air valve 80 will be closed.

When switch 162 is closed to apply voltage across conductors 164 and 166, a bag clamp solenoid 174 (see FIG 4A) will be energized through a set of normally closed contacts BIP–1 of a bag-in-place relay BIP. Solenoid 174, as shown in FIG. 3, is operatively connected to a valve 176. Valve 176 controls the supply and exhaust of air for operating motor 111. When solenoid 174 is energized, valve 176 is actuated to a position where piston rod 108 will be retracted to lift pad 196. Thus, bag clamping assembly 104 will be in a released position when solenoid 174 is energized.

A limit switch 180, as shown in FIG. 3 and 4A, is operatively connected to valve 64 so that it will be actuated to its circuit-interrupting, opened position when valve 64 is displaced to its full open position. When valve 64 is not fully opened, therefore, switch 180 will be closed.

A limit switch 181 is ganged to switch 180 so that it will be open when switch 180 is closed and will close when switch 180 opens.

With valve 64 open, a further limit switch 183, which is actuated by operation of valve 64, will be open. Switch 183 will close when valve 64 is actuated to its fully closed position. Another limit switch 182 is ganged to switch 183 so that it will be closed when switch 183 is opened, and will open when switch 183 closes. With valve 64 open, switches 180–184 will therefore be in their illustrated positions.

A further limit switch 184, which is actuated by operation of valve 80, will be closed when air valve 80 is in its fully closed position. Another limit switch 185 is ganged to switch 184 so that it will be open when switch 184 is closed and will close when switch 184 opens.

Referring to FIGS. 3 and 4B, a further limit switch 186 is so actuated by operation of discharge door 56 that it will be closed when door 56 is fully closed and will open when door 56 begins to open. Still another limit switch 187 is ganged to switch 186 so that it will be open when switch 186 is closed and will close when switch 186 is opened. Thus, with discharge door 56 closed, switch 186 will be closed, and switch 187 will be open.

With continuing reference to FIGS. 3 and 4B, still another limit switch 188, which is actuated by pivotal motion of beam structure 30, will be closed when beam structure 30 is in an unbalanced position and will open when beam 30 is pivoted to its static, balanced position between stops 44 and 46. A further limit switch 189 is ganged to switch 188 so that it will be open when switch 188 is closed and will be closed when switch 188 is opened. Thus, when beam 30 is in its unbalanced position, switch 188 will be closed, and switch 189 will be open.

To condition the apparatus for operation, motor 88 is energized by closing, for example, a disconnect switch 191 (see FIG 4A). Switch 162 is also closed to apply voltage across conductors 164 and 166 as well as across conductors 170 and 172. By applying voltage across conductors 164 and 166, solenoid 174 is energized to operate bag clamping assembly 104 to its release position in the manner previously described.

Semiautomatic operation of the apparatus is initiated by selectively actuating a three-position selector switch 222 (FIG. 4A) to its circuit-making, "run" position. Switch 222, which will be described in greater detail later on, is mounted on a suitable control panel 193 (FIG. 1).

As shown in FIG. 4B, limit switches 186 and 188 are connected in series with a solenoid 192 between conductors 170 and 172. Thus, when switch 162 is closed, a circuit is completed through limit switches 186 and 188 to energize solenoid 192. Solenoid 192, as shown in FIG. 3, is operatively connected to suitable valve 194 which controls the supply and exhaust of operating air for operating a suitable fluid-driven motor 196. Motor 196 may be of any suitable conventional form and is shown to be of the reciprocable type having a piston 198 slidable in a cylinder 200 and connected by a linkage 202 to feed door 52. When solenoid 192 is energized by virtue of closing switch 162, it actuates valve 194 for supplying pressurized air to that operating port which operates motor 196 to open feed door 52.

By virtue of opening feed door 52, material in supply bin 48 is discharged by gravity in a continuous, descending stream into hopper 28. Discharge door 56, it will be recalled, is, at this stage, closed.

As the weight of material delivered to hopper 28 approaches the value which will counterbalance weights 42, beam structure 30 swings away from its rest position against stop 44 and will approach its static, balanced position between stops 44 and 46.

When the weight of material delivered to hopper 28 very closely approaches the preselected weight that will counterbalance weights 42, switch 188 will open, and switch 189 will close. By opening switch 188, solenoid 192 is deenergized. Deenergization of solenoid 192 actuates valve 194 to operate motor 196 in such a manner that the motor will close feed door 52. Delivery of material from supply bin 48 to hopper 28 will therefore be interrupted. The weight of material delivered to hopper 28 will now be the preselected weight as determined by the weight of counterweights 42.

By closing switch 189, a lamp 206 is illuminated to indicate that the preselected weight of material is in hopper 28 and is ready for discharge into tank 66.

By virtue of closing switch 189, a relay SRX, which is in parallel with lamp 206, will also be energized through switch 186. Energization of relay SRX closes a set of normally open contacts SRX-1 (see FIG. 4A) to complete a circuit for energizing a butterfly valve operating solenoid 208. This energizing circuit may be traced from conductor 164 through a set of normally closed contacts BTC-1 of a blow tank cycle latch coil BTC1, through switch 180, through contacts SRX-1, and through solenoid 208 to conductor 166.

Solenoid 208, as shown in FIG. 3, is operatively connected to four-way valve 210 which controls the supply and exhaust of operating air for operating a suitable, fluid-driven motor 212. Motor 212 may be of any suitable; conventional form and is shown to be of the reciprocable type having a piston 214 slidable in a cylinder 216 and connected by a motion transmitting linkage 218 to shaft 128. When solenoid 208 is energized, it actuates valve 210 for supplying pressurized air to motor 212 in such a manner that motor 212 will be operated to open valve 64. By opening valve 64, valve 78 will close.

When butterfly valve 64 reaches its fully open position, limit switch 180 will open, and limit switch 181 will close. By opening switch 180, the energizing circuit for solenoid 208 will be interrupted. Valve 210, however, will not shift back to its illustrated position until another solenoid 220 is energized.

With switch 222 closed, a relay OKD will be energized when switch 181 is closed by virtue of actuating butterfly valve 64 to its fully opened position. This energizing circuit may be traced from conductor 164, through contacts BTC-1, through switch 181, through switch 222, and through the operating winding of relay OKD to conductor 166. Energization of relay OKD closes two sets of normally open contacts OKD-1 (FIG. 4A) and OKD-2 (FIG. 4B).

By virtue of closing contacts OKD-1, a holding circuit is provided around switch 222 for maintaining relay OKD energized. By closing contacts OKD-2, a circuit is completed for energizing a scale discharge solenoid 226 (FIG. 4B).

Solenoid 226, as shown in FIG. 3, is operatively connected to a suitable valve 228 which controls the supply and exhaust of operating air for operating a suitable, fluid-driven motor 230. Motor 230 may be of any suitable conventional form and is shown to be of the reciprocable type having a piston 232 slidable in a cylinder 234 and connected by a motion transmitting linkage 236 to a toggle lock mechanism of discharge door 56. Discharge door 56 is of the conventional toggle type, and when solenoid 226 is energized, the resulting actuation of valve 228 actuates motor 230 in such a manner as to displace the discharge door toggle mechanism to an overcenter position where the door begins to open. Discharge door 56 will then fully open and will then be held open by the weight of material being dispensed from hopper 28. Door 56 with its conventional toggle mechanism is counter balanced so that it will automatically close when there no longer is any material on the door.

From the foregoing, it will be appreciated that by virtue of energizing solenoid 226, the weighed-out draft of material in hopper 28 will be discharged in a continuous descending stream into tank 66.

By virtue of opening discharge door 56 switch 186 will open and switch 187 will close. By opening switch 186, the energizing circuits for solenoids 192 and 226 and the energizing circuit for relay SRX are interrupted. By closing switch 187 a circuit is completed for energizing a relay SDX (see FIG. 4B). In addition, a lamp 240 will be energized to indicate that the scale is discharging.

Energization of relay SDX closes a set of normally open contacts SDX-1 (FIG. 4A) to energize the blow tank cycle latch coil BTC1. Energization of coil BTC1 will open contacts BTC-1 and will close a set of normally open contacts BTC-2 (FIG. 4A). Contacts BTC-1 and BTC-2 will be latched in their respective opened and closed positions until a blow tank cycle unlatch coil BTC2 (FIG. 4A) is energized later on in the cycle. As a result of closing contacts BTC-2, a partial circuit will be completed for energizing a blow tank charge timer BTCT. This circuit, however, will not be completed at this stage for normally closed contacts SDX-2 of relay SDX will be open. Contacts SDX-2 will be open as a result of having previously energized relay SDX.

After the entire draft of material in hopper 28 is discharged into tank 66 so that there is no longer any weight of material being applied to discharge door 56, door 56, by virtue of being counterweighted or counterbalanced as previously described, will automatically close. By closing door 56 switch 186 will close, and switch 187 will open.

As a result of closing switch 186, solenoid 192 will be reenergized through switch 188. Switch 188, at this stage, will again be closed, for beam structure 30 will be in an unbalanced position as a result of having discharged the draft of material into tank 66. Thus, immediately upon the discharge of the draft of material into tank 66, feed door 52 is again opened to deliver material to hopper 28 for weighing out the next draft.

By virtue of opening switch 187, relay SDX is deenergized to open contacts SDX-1 and to close contacts SDX-2. By closing contacts SDX-2, a circuit is completed for energizing timer BTCT. After a relatively short time delay to ensure that all of the material in transit is delivered to tank 66 timer BTCT will time out.

By timing out, timer BTCT closes a set of time delay contacts BTCT-1 (FIG. 4A) to complete a circuit for energizing solenoid 220. This circuit may be traced from conductor 164, through contacts SDX-2, through contacts BTC-2, through switch 182, through contacts BTCT-1, and through solenoid 220 to conductor 166. Switch 182, at this stage, will be closed, for butterfly valve 64 is open.

By energizing solenoid 220, valve 210 is shifted to its illustrated position with the result that the pressurized air supplied to motor 212 will so operate motor 212 as to close butterfly valve 64. Switch 183 will therefore close, and switch 182 will open. By opening switch 182, solenoid 220 will be deenergized, but valve 210 will not shift from its illustrated position until solenoid 208 is reenergized. The apparatus is now conditioned for discharging the charge of material in tank 66 into bag 24 by selectively closing a spring loaded pushbutton switch 244 (FIG. 4A). Switch 244 is conveniently mounted on control panel 193.

As previously described, the closing of discharge door 56 immediately recycles the scale by energizing solenoid 192 to thereby open feed door 52 and consequently start the delivery of the next draft of material to hopper 28. As this second draft is delivered to hopper 28 and as the weight of material in hopper 28 approaches the preselected value which will counterbalance weights 42, beam structure 30 again will swing toward its static balanced position to between stops 44 and 46. As beam structure 30 closely approaches its static balanced position between stops 44 and 46, switch 188 will open, and switch 189 will close to respectively deenergize solenoid 192 and energize relay SRX. Reenergization of relay SRX will, at this stage, only complete a partial circuit for energizing solenoid 208, for contact BTC-1 at this stage are latched open.

Assuming that the operator of the machine has already placed a bag on nozzle member 90, he may, at any selected time after timer BTCT times out, discharge the charge of material in tank 66 into the bag by depressing switch 244. As a result of actuating switch 244 to its circuit-making position, a circuit is completed through a set of normally closed contacts BTDT-1 of a blow tank discharge timer relay BTDT to energize relay BIP. Energization of relay BIP opens contacts BIP-1 and closes two sets of normally open contacts BIP-2 and BIP-3.

By opening contacts BIP-1, the energizing circuit for solenoid 174 is interrupted with the result that clamping assembly 104 will be actuated in the manner previously described to clamp the nozzle-mounted bag 24 firmly on nozzle member 90. By closing contacts BIP-2, a holding circuit is established around switch 244 for maintaining relay BIP energized after switch 244 is released.

By closing contacts BIP-3, a circuit is completed for energizing a main air valve operating solenoid 250 (FIG. 4A). This circuit may be traced from conductor 164 through contacts SDX-2, through contacts BTC-2, through switch 183, through contacts BIP-3, through an air pressure switch 252, and through solenoid 250 to conductor 166.

Contacts SDX-2 will be closed at this stage, for relay SDX is deenergized. The energizing circuit for this relay is presently interrupted because discharge door 56 is closed. Contacts BTC-2 are also closed in their latched position as previously described. Since butterfly valve 64 is closed, switch 183 will be closed. Switch 252 is connected to conduit 86 upstream from valve 80 and is actuated to its closed position when blower 82 is operating to furnish pressurized air up to valve 80.

Valve 80, as shown in FIG. 3, is operatively connected to solenoid 250 and is opened by solenoid 250 when the solenoid is energized. Thus, it will be appreciated that by depressing switch 244, the bag 24 is clamped in place on nozzle member 90 and valve 80 is opened. With blower 82 in operation, and with valves 80 and 78 open, pressurized air from blower 82 is admitted to chamber 84 for carrying the charge of material in tank 66 into bag 24 on nozzle member 90.

As a result of opening valve 80, switch 185 is closed, and switch 184 is opened. By closing switch 185, a blow tank discharge timer BOD is energized through contacts SDX-2 and BTC-2. After a short time delay to ensure that all of the material in tank 66 is discharged into bag 24, timer BOD times out to close a set of normally open time delay contacts BOD-1 (FIG. 4A). By closing contacts BOD-1, a circuit is completed for energizing relay BTDT through contacts SDX-2 and BRC-2.

Energization of relay BTDT closes normally open contacts BTDT-2 (FIG. 4A) to provide a holding circuit around switch 185 for maintaining timer BOD energized after switch 185 opens. With this circuit, timer BOD will be locked in so that when it times out, its contacts will not be reset.

Energization of relay BTDT opens contacts BTDT-1 to deenergize relay BIP. Contacts BIP-1 consequently close to energize solenoid 174 with the result that clamping assembly 104 will be actuated to its release position where the filled bag on nozzle member 90 is unclamped. Deenergization of relay BIP resets the relay's contacts.

By virtue of opening contacts BIP-3, solenoid 250 is deenergized to close valve 80, thus blocking flow of pressurized air into chamber 84. By closing valve 80, switch 185 will consequently open, and switch 184 will close. This will complete an energizing circuit for solenoid 258 through contacts BOD-2. Contacts BOD-2 will be closed as a result of timer BOD previously timing out.

Solenoid 258, as shown in FIG. 3, is operatively connected to a suitable valve 260 which controls the supply and exhaust of air for operating motor 117. When valve 260 is actuated by energization of solenoid 258 it so supplies pressurized air to motor 117 that the motor is operated to tilt platform 112 to its position indicated at 116 where the unclamped, filled bag on nozzle member 90 is ejected in the manner previously described. When platform 112 reaches its fully tilted bag ejecting position indicated at 116 in FIG. 2, a limit switch 264 (FIG. 4A) is actuated to its closed position to complete a circuit for energizing coil BTC2 through contacts SDX-2, BTC-2 and BOD-2 and through switch 184. Even though timer BOD has timed out, contacts BOD-2 remain closed by virtue of the locked-in circuit which is provided by contacts BTDT-2.

Energization of coil BTC2 closes contacts BTC-1 and opens contacts BTC-2. By opening contacts BTC-2 the energizing circuits for relay BTDT, for timers BOD and BTCT, for solenoid 258, and for coil BTC2 are all interrupted. As a result, the contacts of relay BTDT and of timers BOD and BTCT are all reset in preparation for the next cycle.

It will be recalled that at this stage, contacts SRX-1 will be closed by virtue of having energized relay SRX when the second draft of material was delivered to hopper 28 to swing beam structure 30 to its balanced static position. Thus, when coil BTC2 is energized to close contacts BTC-1 the circuit for reenergizing solenoid 208 is completed through switch 180 and through contacts SRX-1. Motor 212 will consequently be operated in the manner previously explained to open butterfly valve 64. As a result, switch 181 will close, and switch 180 will open. By closing switch 181, the circuit for reenergizing relay OKD is completed to close contacts OKD-2.

By closing OKD-2 solenoid 226 is reenergized to open discharge door 56. The second draft of material in hopper 28 will therefore be delivered to tank 66 in the manner previously explained.

By virtue of opening door 56, switch 186 will open, and switch 187 will close. By virtue of closing switch 187, relay SDX will reenergized to close contacts SDX-1. Coil BTC1 will therefore be reenergized to open contacts BTC-1 and to close contacts BTC-2. Relay OKD will therefore be deenergized again and when discharge door 56 recloses, timer BTCT will be reenergized.

When timer BTCT times out, contacts BTCT-1 close to reenergize solenoid 220 as previously described. Butterfly valve 64 will therefore close.

Having discharged the second draft from hopper 28, beam structure 30 swings back to its unbalanced position. Switches 186-188 will consequently resume the positions illustrated in FIG. 4B to initiate the delivery of the third draft of material delivered to hopper 28. When the weight of the third draft of material delivered to hopper 28 so counterbalances weights 42 that beam structure 30 is swung to its static, balanced position between stops 44 and 46, switch 189 will close, and switch 188 will open to close feed door 52 and thereby interrupt the delivery of material to hopper 28 as previously explained.

The third draft of material is now in hopper 28, the second draft of material is now in tank 66, and the operator may repeat the cycle by actuating switch 244 to its closed position.

From the foregoing description it will be appreciated that the bag filling apparatus, upon being selectively activated, will, without further selective or manual operation, automatically weigh out two successive drafts of material of preselected weight. The first draft will be dispensed to tank 66 in preparation for delivery to bag 24 by depressing switch 222. The second draft will remain in hopper 28 until the first draft in tank 66 is delivered to the bag and the bag is ejected. When this occurs, the second draft will be discharged to tank 66, and scale 20 will automatically weigh out the third draft as soon as discharge door 56 closes by virtue of completing the discharge of the second draft.

With the foregoing control arrangement and apparatus, it is also clear that the rate at which bags can be successively filled is maximized, for there is no delay between the time one draft of material is discharged from hopper 28 and the time the delivery of the next draft to the hopper is initiated.

The rate at which scale 20 will weigh out successive drafts of material is only dependent upon three factors. One is the inherent capability of the scale, and the other is the rapidity at which the material in tank 66 can be discharged. The third is the manual dexterity of the operator in placing bags on nozzle member 90.

Discharge of the charge of material in tank 66 is increased significantly to more closely match the high-speed capabilities of a scale such as the one described in U.S. Pat. No. 3,252,531 by blowing the charge out in a high-velocity air stream as previously described. By virtue of the foregoing features and by selecting proper equipment, the bag filling apparatus of this invention is superior in accuracy and speed as compared with other comparable filling machines and also with those which utilize the previously described gross-weighing principle. As an example, the bag filling apparatus of this invention is easily capable of delivering to the bags 8 to 12 accurately weighed, 50 pound drafts per minute depending, among other things, upon the size and character of the material.

It will therefore be appreciated that contacts BTC-1 and BTC-2 constitute bistable storage devices to form an electrical memory storage network. When discharge door 56 is opened to discharge a draft of material in hopper 28, relay SDX and, consequently, coil BTC1 will be energized to change the bistable conditions of contacts BTC-1 and BTC-2 respectively to open and closed positions. Thus, these bistable conditions indicate that a draft of material has been discharged to tank 66. These bistable conditions will be retained to prevent delivery of the next draft of material to tank 66 until the first draft of material in tank 66 is discharged. Thus, due to the fact that coil BTC2 will not energize until the apparatus has cycled, closing contacts BOD-2 and SDX-2 and switches 184 and 264. If these conditions occur, the draft of material will have been discharged from tank 66, and coil BTC2 will be energized to change the bistable conditions of contacts BTC-1 and BTC-2 back to closed and opened positions respectively.

Discharge of the draft in tank 66 therefore effectively erases the memory retained by contacts BTC-1 and BTC-2, and with contacts BTC-1 closing again the circuit is again conditioned to energize the scale discharge solenoid as a result of opening valve 64 and energizing relay OKD.

It will also be appreciated that neither a prolonged or momentary power failure will be effective to alter the settings of contacts BTC-1 and BTC-2 which indicate that a charge is in tank 66. Power failure will therefore not cause the delivery of a charge to tank 66 before the preceding charge in the tank is discharged.

It also will be noted that solenoid 250 cannot be energized to open valve 80 unless contacts SDX-2 and switch 183 are closed. Switch 183 will not close unless valve 64 is closed, and contacts SDX-2 will not close unless discharge door 56 is closed indicating that the draft of material has been completely discharged from hopper 28. Valve 64 must therefore be closed in order to open valve 80, thus ensuring that pressurized air supplied to chamber 84 does not blowback to allow tank 66 to be depressurized. It also will be noted that valve 64 does not open until scale 20 is in a balanced condition. As a result, no blowback can occur to adversely influence the operation of scale 20 during the period when a draft is being weighed out.

As shown in FIG. 4A, switch 222, which is of the three position type, will be open when actuated to either of the two positions indicated as "cleanout" and "hold." Switch 222 is ganged to a second three position switch 290 which will be open when switch 222 is in either its circuit-making "run" position or its circuit-interrupting "hold" position. However, switch 290 will close when switch 222 is actuated to its circuit-interrupting "cleanout" position. Switch 290 is in parallel with contacts SDX-1. The cleanout positions of switches 222 and 290 are momentary, with a spring return being operative to return to center or neutral position.

In the cleanout positions of switches 222 and 290, therefore, the former will be open, but the latter will close to energize coil BTC1 without requiring the delivery of a charge to tank 66. Since switch 222 will be open relay OKD will not energize and solenoid 226 will consequently not energize to open door 56. Energization of coil BTC1, however, will energize solenoid 220 through contacts BTCT-1 after timer BTCT times out. Valve 64 will therefore close, and when switch 244 is depressed, valve 80 will be opened to blowout any material that may be in tank 66. Switches 222 and 290 therefore enable the operator to empty tank 66 while retaining a charge of material in hopper 28.

By actuating switches 222 and 290 to their "cleanout" positions it therefore is clear that entry of a charge to tank 66 is simulated to provide for a complete cycle of operation with no charge present in the tank. This enables the operator to make adjustments on the timers and other components in the system without discharging any material. It also enables the operator to clean tank 66 after it has been cleared.

If switches 222 and 290 are turned to their circuit-interrupting "hold" positions while a charge in tank 66 is discharging, valve 64 will open in the next cycle but operation will be arrested at this point, and no charge of material will be delivered to the tank. Any suitable source of air under pressure may be provided for the fluid-operated motors shown in FIG. 3.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An apparatus for filling bags with fluent material in solid form comprising a weighing mechanism responsive to the weight of material delivered thereto for weighing out and discharging successive, discrete, measured drafts of said material with each draft having a preselected weight, means defining a chamber for receiving each weighed draft of said material discharged by said weighing mechanism, means providing for the discharge of each weighed draft of said material from said chamber to one of the bags to be filled, means for memorizing the delivery of each weighed draft of material to said chamber by said weighing mechanism, and means controlled by said memorizing means for conditioning said weighing mechanism to prevent the delivery of the next draft to said chamber until after the draft in said chamber is discharged from said chamber.

2. The apparatus defined in claim 1 wherein said means providing for the discharge of the weighed-out drafts of material from said chamber comprises selectively actuatable means.

3. The apparatus defined in claim 1 wherein said weighing mechanism is operative to weigh out and discharge only one draft of material at a time.

4. The apparatus defined in claim 3 wherein said memorizing means comprises electrical circuit means.

5. An apparatus for filling bags with fluent material in solid form comprising a weighing mechanism responsive to the weight of material delivered thereto for cyclically weighing out and discharging successive, discrete, measured drafts of said material, with each draft having a preselected weight, means defining a chamber for receiving each of the weighed-out drafts of material discharged by said weighing mechanism, a bag filling spout in communication with said chamber to provide an outlet for discharging each weighed-out draft of material from said chamber, means for securing a bag to be filled on said spout, control means providing for the discharge of the complete weighed-out draft of material from said chamber to a bag on said spout, means controlling delivery of the material to be weighed out to said weighing mechanism and being responsive to the discharge of each weighed-out draft of material from said weighing mechanism for automatically initiating the delivery of additional material to said weighing mechanism to make up the next draft, means for memorizing the delivery of each weighed-out draft of material to said chamber, and means controlled by said memorizing means for preventing said weighing mechanism form discharging the next weighed-out draft of material until after the preceding draft has been discharged from said chamber.

6. The apparatus defined in claim 5 wherein said chamber has an inlet opening through which the material discharged from said weighing mechanism passes, said apparatus further comprising means for introducing pressurized air into said chamber for discharging the material through said spout, and valve means carried by said chamber-defining means for blocking said inlet opening to prevent the pressurized air from blowing back through said inlet opening.

7. An apparatus for filling bags with fluent material in solid form comprising a weighing mechanism responsive to the weight of material delivered thereto for cyclically weighing out and discharging successive, discrete, measured drafts of said material, with each draft having a preselected weight, means defining a chamber for receiving the drafts of material discharged by said weighing mechanism, a bag-filling spout in communication with said chamber to provide an outlet for discharging each weighed-out draft of material from said chamber, means for securing a bag to be filled on said spout to receive a weighed-out draft discharged from said chamber, means providing for the discharge of the complete weighed-out draft of material from said chamber to a bag on said spout, means controlling delivery of the material to be weighed out to said weighing mechanism and being responsive to the discharge of each weighed-out draft of material from said weighing mechanism for automatically initiating the delivery of additional material to said weighing mechanism to make up the next draft, electrical circuit means for memorizing the delivery of each draft of material to said chamber, and means controlled by said electrical circuit means for preventing said weighing mechanism from discharging the next weighed-out draft of material until after the preceding draft has been discharged from said chamber.

8. An apparatus for filling bags with bulk material comprising a weighing mechanism for weighing out and discharging successive, discrete, measured drafts of said material, a hopper forming a part of said weighing mechanism for receiving material to be weighed out and discharged in said drafts, a blowdown tank for receiving the drafts discharged by said weighing mechanism and having a bag-filling spout, means responsive to the discharge of each draft of material from said hopper for initiating the delivery of additional material to said hopper for making up the next measured draft, and control means for introducing pressurized air into said tank for discharging the material therein through said spout and for conditioning said weighing mechanism to discharge the next draft of material after the preceding draft has been discharged from said tank.

9. An apparatus for filling bags with bulk material comprising a weighing mechanism for weighing out and discharging successive, discrete, measured drafts of said material, a hopper forming a part of said mechanism for receiving the material to be weighed and discharged in said drafts, discharge valve means forming a part of said weighing mechanism and being displaceable between opened and closed positions for respectively enabling material to be discharged from said hopper, a blowdown tank for receiving the drafts discharged by said mechanism and having a bag-filling spout, means responsive to the discharge of each draft of material from said hopper for initiating the delivery of additional material to said hopper to make up the next draft, selectively actuatable control means for introducing pressurized air into said tank for discharging the material therein through said spout, means comprising a control circuit for operating said discharge valve means and switching means selectively actuatable to alternate positions, said switching means, when actuated to one of said alternate positions, conditioning said control circuit to open said discharge valve means after the draft of material in said chamber is discharged by said control means, and said switching means, when actuated to another one of said positions, preventing said control circuit from being conditioned to open said discharge valve means, but enabling pressurized air to be introduced into said chamber by actuation of said control means.

10. An apparatus for filling bags with bulk material comprising means defining a chamber for receiving successive, discrete, preweighed drafts of said material, means defining an outlet providing for the discharge of material from said chamber to one of the bags to be filled, a weighing mechanism for weighing the drafts of material to be delivered to said chamber and for delivering the weighed drafts one at a time to said chamber, bistable electrical means having first and second stables states, means responsive to the delivery of each of said drafts to said chamber for actuating said bistable means to said first state, control means adapted to be selectively actuated for discharging the draft of material from said chamber, and means controlled by said control means for actuating said bistable means to said second state a predetermined time after said control means is actuated to discharge the draft of material in said chamber, said weighing mechanism being conditioned by said bistable means to prevent delivery of the material to said chamber when said bistable means is in said first state and to enable delivery of the material to said chamber when said bistable means is in said second state, said weighing mechanism comprising a hopper for receiving the bulk material to be weighed out in said discrete drafts, means operatively connected to said hopper for interrupting the delivery of said material to said hopper in response to the accumulation of a predetermined weight of the material in said hopper, and a discharge valve displaceable between closed and opened positions for respectively blocking discharge of material from said hopper and enabling discharge of material from said hopper, said apparatus further comprising actuating means controlled by said bistable means and being operatively connected to said discharge valve for opening said discharge valve when said bistable means is actuated to said second state and for maintaining said discharge valve closed when said bistable means is actuated to said first state.

11. The apparatus defined in claim 10 wherein said chamber is formed with an inlet opening for receiving material discharged from said hopper, said apparatus further comprising means for introducing pressurized air into said chamber for dispensing the material therein into the bag to be filled, and valve means for blocking said inlet opening when said pressurized air is introduced into said chamber to prevent blowback of said pressurized air through said inlet opening.

12. An apparatus for filling bags with bulk fluent material in solid form comprising means defining a chamber for receiving successive, discrete, preweighed drafts of said material, means defining an outlet providing for the discharge of material from said chamber to one of the bags to be filled, a weighing mechanism for weighing the drafts of material to be delivered to said chamber and for delivering the weighed drafts one at a time to said chamber, bistable electrical means having first and second stable states, means responsive to the delivery of each of said drafts to said chamber for actuating said bistable means to said first state, control means adapted to be selectively actuated for discharging the draft of material from said chamber, and means controlled by said control means for actuating said bistable means to said second state a predetermined time after said control means is actuated to discharge the draft of material in said chamber, said predetermined time being sufficiently long to allow for the discharge of the draft of material from said chamber, said weighing mechanism being conditioned by said bistable means to prevent delivery of the material to said chamber when said bistable means is in said first state and to enable delivery of the material to said chamber when said bistable means is in said second state.

13. The apparatus defined in claim 12 wherein each bag to be filled is of the valve type having a filling opening, wherein said means defining said outlet comprise s a bag-filling spout configured for removable insertion into the opening of the valve-type bag to be filled, and wherein means are provided for removable securing the valve-type bag to be filled on said spout.

14. An apparatus for filling bags with fluent material comprising a weighing mechanism having a hopper and being responsive to the weight of material delivered to said hopper for weighing out successive, discrete, measured drafts of said material, discharge gate means forming a part of said weighing mechanism and being operated between opened and closed positions for respectively providing for and blocking the discharge of each weighed-out draft of material in said hopper, means defining a chamber for receiving the drafts of material discharged from said hopper by said gate means, a spout communicating with said chamber to provide an outlet for discharging each weighed-out draft of material from said chamber, means for securing a bag to be filled to said spout, control means adapted to be selectively actuated to provide for the discharge of each weighed-out draft of material in said chamber through said spout to supply each complete weighed-out draft to a bag, and means responsive to the discharge of a weighed-out draft from said hopper for initiating the delivery of material to be weighed to said hopper for making up a measured draft of said material regardless of the presence or absence of a preceding draft of material in said chamber.

15. The apparatus defined in claim 14 comprising time responsive means for preventing said discharge gate means from opening for a predetermined time period after said control means is selectively actuated to effect the discharge of material from said chamber.

16. The apparatus defined in claim 14 comprising an operator operatively connected to said discharge gate means and being actuatable to open said discharge gate means, an electrical control circuit for actuating said operator to effect the opening of said discharge gate means, and time delay means for preventing said circuit from actuating said operator for a predetermined time period after said control means is selectively actuated to effect the discharge of the material from said chamber.

17. The apparatus defined in claim 16 wherein said chamber has an inlet opening through which the material discharged from said hopper passes, and wherein said control means comprises means for introducing pressurized air into said chamber for discharging the material therein, said apparatus further comprising valve means disposed at said inlet opening and being displaceable between opened and closed positions by said control circuit for respectively allowing material to be delivered to said chamber and blocking flow of pressurized air out of said chamber, and interlock means for preventing introduction of the pressurized air into said chamber until after said valve means is displaced to its closed position, whereby blowback of the pressurized air through said inlet opening is prevented.

* * * * *

UNITED STATES PATENT OFFICE
CERTIFICATE OF CORRECTION

Patent No. 3,618,684          Dated November 9, 1971

Inventor(s) Arthur J. Burke; Benjamin Martyn; George C. Troost

It is certified that error appears in the above-identified patent and that said Letters Patent are hereby corrected as shown below:

Abstract, line 13, change "weight" to -- weigh --.

Column 2, line 69, change "weight" to -- weigh --.

Column 5, line 58, change "196" to -- 106 --.

Column 7, line 11, change "semi-colon(;) to -- coma (,) --.

Column 9, line 30, change "BRC-2" to -- BTC-2 --.

Column 10, line 14, after "will" insert -- be --.

Column 10, line 26, delete "delivered".

Column 12, line 18, Claim 1, after "material" insert --,--.

Column 12, line 60, Claim 5, change "form" to -- from --.

Column 13, line 42, Claim 9, after "hopper" and before the comma insert -- and blocking the discharge of material from said hopper --.

Signed and sealed this 2nd day of May 1972.

(SEAL)
Attest:

EDWARD M. FLETCHER, JR.          ROBERT GOTTSCHALK
Attesting Officer                Commissioner of Patents